United States Patent

[11] 3,561,554

| [72] | Inventors | Layton C. Merriam<br>Mendon, Vt.;<br>Arthur J. Burke, Oakland, N.J. |
|---|---|---|
| [21] | Appl. No. | 838,099 |
| [22] | Filed | July 1, 1969 |
| [45] | Patented | Feb. 9, 1971 |
| [73] | Assignee | Howe Richardson Scale Company<br>Clifton, N.J.<br>a corporation of Delaware |

[54] ELECTRICAL WEIGHING APPARATUS WITH INCREMENTAL LOAD-COUNTERBALANCING MEANS
14 Claims, 9 Drawing Figs.

[52] U.S. Cl. ................................................ 177/203,
177/211, 177/256
[51] Int. Cl. ................................................ G01g 1/34
[50] Field of Search ................................................ 177/203–205, 210, 211, 237, 256, 257, 258, 158, 165, 212

[56] References Cited
UNITED STATES PATENTS

| 2,631,027 | 3/1953 | Payne | 177/210 |
| 2,766,981 | 10/1956 | Lauler et al. | 177/211 |
| 2,914,310 | 11/1959 | Bahrs | 177/212X |
| 3,167,140 | 1/1965 | Hagerman | 177/158X |
| 3,312,298 | 4/1967 | Best et al. | 177/158 |
| 3,415,333 | 12/1968 | Simonds | 177/210 |
| 3,477,533 | 11/1969 | Hyer et al. | 177/165X |

Primary Examiner—Richard B. Wilkinson
Assistant Examiner—George H. Miller, Jr.
Attorney—Norris and Bateman ABSTRACT: A weighing apparatus having a load cell operatively connected to the lever system of a scale so that the output signal voltage of the load cell represents the load-produced force that is transmitted by the lever system to the input of the load cell. A control circuit responds to the load cell output signal voltage to back balance a portion of the load being measured with range weights that are applied to the lever system so that the effective operating range of the load cell is limited to only a fractional proportion of the total scale capacity. As load-counterbalancing weights are added and removed, the control circuit also operates a multirange chart in a weight indicating dial mechanism to provide a readout of the total weight of the load.

INVENTORS
ARTHUR J. BURKE
LAYTON C. MERRIAM
BY
Norris & Bateman
ATTORNEYS

INVENTORS
ARTHUR J. BURKE
BY  LAYTON C. MERRIAM

Norris & Bateman
ATTORNEYS 3,561,554

FIG. 5

INVENTORS
ARTHUR J. BURKE
LAYTON C. MERRIAM

BY Norris & Bateman

ATTORNEYS

3,561,554

ELECTRICAL WEIGHING APPARATUS WITH INCREMENTAL LOAD-COUNTERBALANCING MEANS

FIELD OF INVENTION

The invention relates to weighing systems in which load cells are employed to sense scale loading conditions for providing weight indications.

BACKGROUND OF INVENTION

In the past it has been the custom to connect a load cell to the lever system of a scale so that the electrical load cell output signal is representative of the entire weight of a load applied to the scale. The load cell output voltage is applied to operate such electrical equipment as a weight-indicating dial mechanism. One example of such a system is described in U.S. Letters Pat. No. 2,766,981 issued on Oct. 16, 1956 for Weighing Scale System. Strain gage load cells are customarily used in such scale systems.

There are several factors which adversely affect the sensitivity and accuracy of the foregoing type of load cell scale system. They include the nonlinearity characteristics of the load cell output signal relative to the input force, temperature stability problems, balance bridge resistor tolerances, and other electrical system inaccuracies as well as mechanical system inaccuracies.

Prior to this invention, many proposals have been made for improving the accuracy and sensitivity of such scale systems by improving the load cell construction or by adding electrical circuits that modify the load cell voltage signal with compensating signals. Aside from the increased costs of manufacture, these prior proposals have not been entirely satisfactory, particularly for handling large scale capacities.

SUMMARY AND OBJECTS OF THE INVENTION

This invention, in contrast to the foregoing proposals, provides a different approach and solution to the problem. It resides in limiting the range of the input force to the load cell by counterbalancing at least a part of the load being measured when the load cell output signal exceeds a predetermined magnitude. For this purpose a drop weight or multirange weight mechanism is employed for applying range or drop weights to the lever system of the scale in counterbalancing relation to the load to reduce the magnitude of the force transmitted to the load cell by predetermined amounts. As a result, the range of the forces transmitted to the load cell can be reduced to a fractional proportion of the total range or capacity of the scale.

Consider as an example an 80,000 pound scale. In accordance with the present invention the scale capacity is divided into a number of preferably equal ranges such as eight ranges at 10,000 pounds per range. Each range weight in the drop weight or multirange weight mechanism will therefore be 10,000 pounds. When the load being measured exceeds 10,000 pounds the drop weight mechanism is actuated to apply one or more range weights to the lever system such that the input force applied to the load cell is reduced to a weight-indicating value corresponding to or less than 10,000 pounds. Therefore the weight indicating range to which the load cell will be subjected will no longer be 0—80,000 pounds. Instead, it will be reduced to 0—10,000 pounds by virtue of the counterbalancing effect of the range weights.

Assuming that a commercially available precision lever system is used and also that commercially available load cell and amplifier equipment is used in this invention the expected error attributable to the lever system will be on the order of one part in 10,000 or 8 pounds at full scale and the expected error attributable to the electrical equipment (including the load cell and amplifier) will be about 0.05 percent. Since the weight-indicating range of forces applied to the load cell is effectively confined to a range of 10,000 pounds by virtue of the drop weight mechanism, the maximum weighing inaccuracy attributable to the electrical equipment will conservatively be 0.05 percent of 10,000 pounds or 5 pounds. Owing to the fact that the variations in both the electrical system error and the mechanical system error are essentially random, total effected inaccuracy of the weighing apparatus will be equal to the square root of the sum of the squares of 8 pounds and 5 pounds or slightly less than 9 pounds at full scale capacity (namely 80,000 pounds).

Using the same lever system and the same load cell and amplifier equipment in a prior art system which does not utilize a back-balancing multiweight mechanism in conjunction with the load cell, the total expected inaccuracy of the apparatus will be on the order of 80 pounds at full scale capacity.

To operate the drop weight or multirange mechanism, the present invention further provides a control circuit which is responsive to the load cell output signal to automatically back balance the load being weighed with one or more range weights when the input force to the load cell increases above a predetermined level and to automatically decrease the back-balancing range weight force when the load cell signal falls below a preset level.

With the foregoing in mind, it is a primary object of this invention to improve the weighing accuracy of those systems that utilize a load cell for producing a weight-representative signal.

A more specific object of this invention is to provide a load cell weight measuring system with a mechanism that is operable to position weights in the lever system of a scale in counterbalancing relation to the load being measured for reducing the force input to the load cell, whereby the effective weight-indicating operating range of the load cell is reduced to only a fraction of the scale capacity to thus provide for a more accurate weight indication.

Another more specific object of this invention is to provide a control circuit which responds to the load cell output signal for automatically operating the mechanism referred to in the preceding object.

Still another object of this invention is to provide the above-mentioned control circuit with an electrical network whereby application and removal of load-counterbalancing weights may selectively be accomplished as an alternate to automatic operation.

Further objects of this invention will appear as the description proceeds in connection with the appended claims and annexed drawings herein.

DETAILED DESCRIPTION

Figure 1:
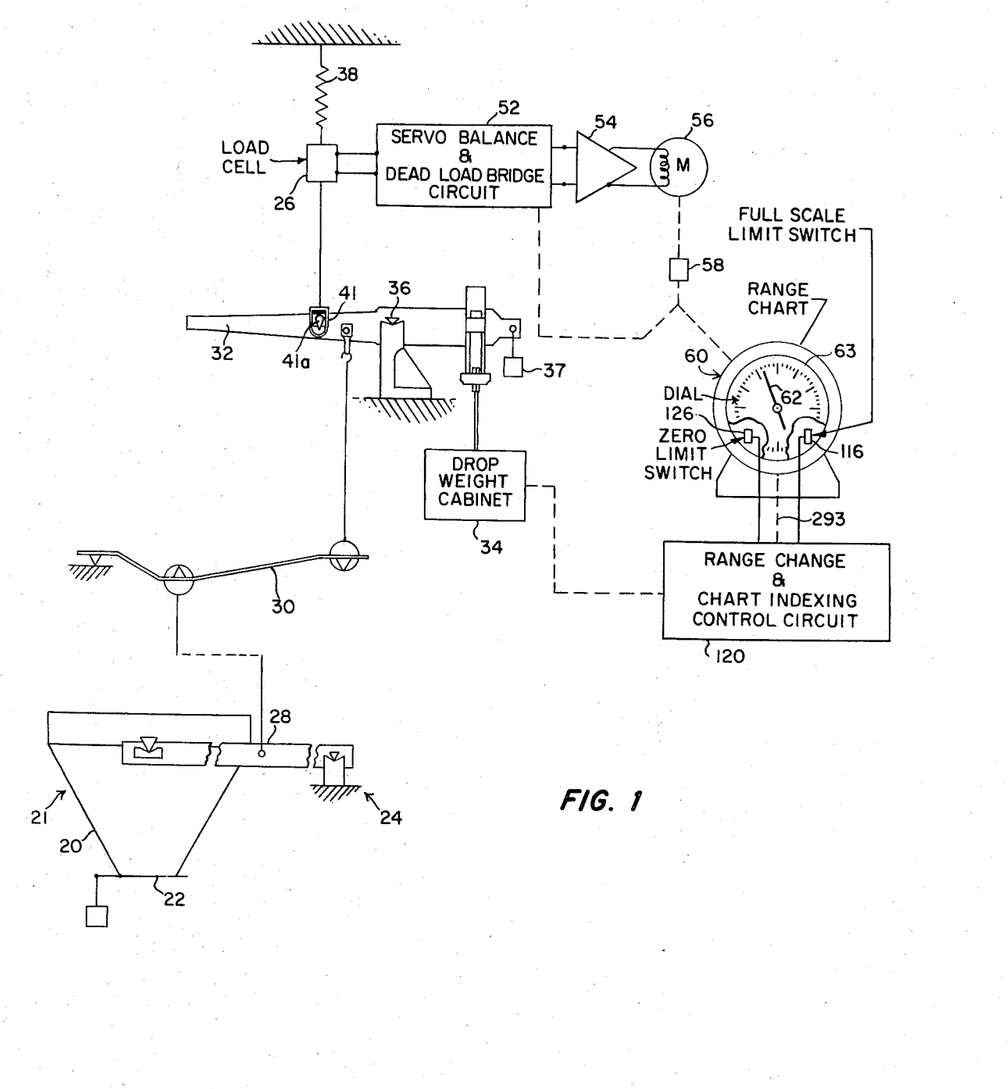
FIG. 1 is a generally diagrammatic view of a weighing system incorporating the principles of this invention.

Referring now to the drawings and first to FIG. 1, the reference numeral 21 generally designates a scale mechanism having a load support structure 20 which by way of example is shown in this embodiment to be a weigh hopper having a suitable discharge door 22. Door 22 is operated to discharge material delivered to and weighed out in the hopper. For purposes of this invention, any other form of load support structure may be employed such as a scale platform or tank.

Support structure 20 is operatively connected by a lever and drop weight system 24 to a load cell 26. Lever system 24 may be of any suitable form depending upon the type of load support structure used. In this embodiment, system 24 is shown to schematically comprise a pivotally mounted hopper support beam 28 which is connected by a pivotally mounted lever 30 to a pivotally mounted drop weight lever 32 or the like.

When a load—which in this case may be material—is delivered to the weigh hopper, the resulting force applied to the weigh hopper is transmitted to lever 32 and is counterbalanced at least in part by range or drop weights in dropweight mechanism 34 as will be explained in detail later on. As shown, lever 32 is pivoted about a horizontal axis by a knife edge and fulcrum assembly 36. Drop weight mechanism 34 is operatively connected to lever 32 on one side of its pivot axis, and the force attributable to the load received in the weigh hopper is applied to lever 32 on the opposite side of its pivot axis. Lever 32 may be regarded as the output lever of system 24 which as previously mentioned may be of any suitable form.

A counterweight 37 is connected to lever 32 to counterbalance or tare out the dead load of the weigh hopper, the lever system, and other structure which is suspended from lever 32. Pivotal motion of lever 32 in opposite directions is limited by closely spaced upper and lower stops 39a and 39b.

Still referring to FIG. 1, load cell 26, which is usually of the conventionally strain gauge type, is suspended from a stationary support surface by a spring 38. A force-transmitting linkage which is connected to the strain responsive element of load cell 26 terminates in a yoke piece 41 in which a knife edge 41a is seated. Knife edge 41a is fixed to lever 32. With this arrangement, the strain responsive element of load cell 26 is directly subjected to pivotal displacement of lever 32 which is produced by delivering a load to the weigh hopper. The purpose of spring 38 will be described later on.

Figure 2:
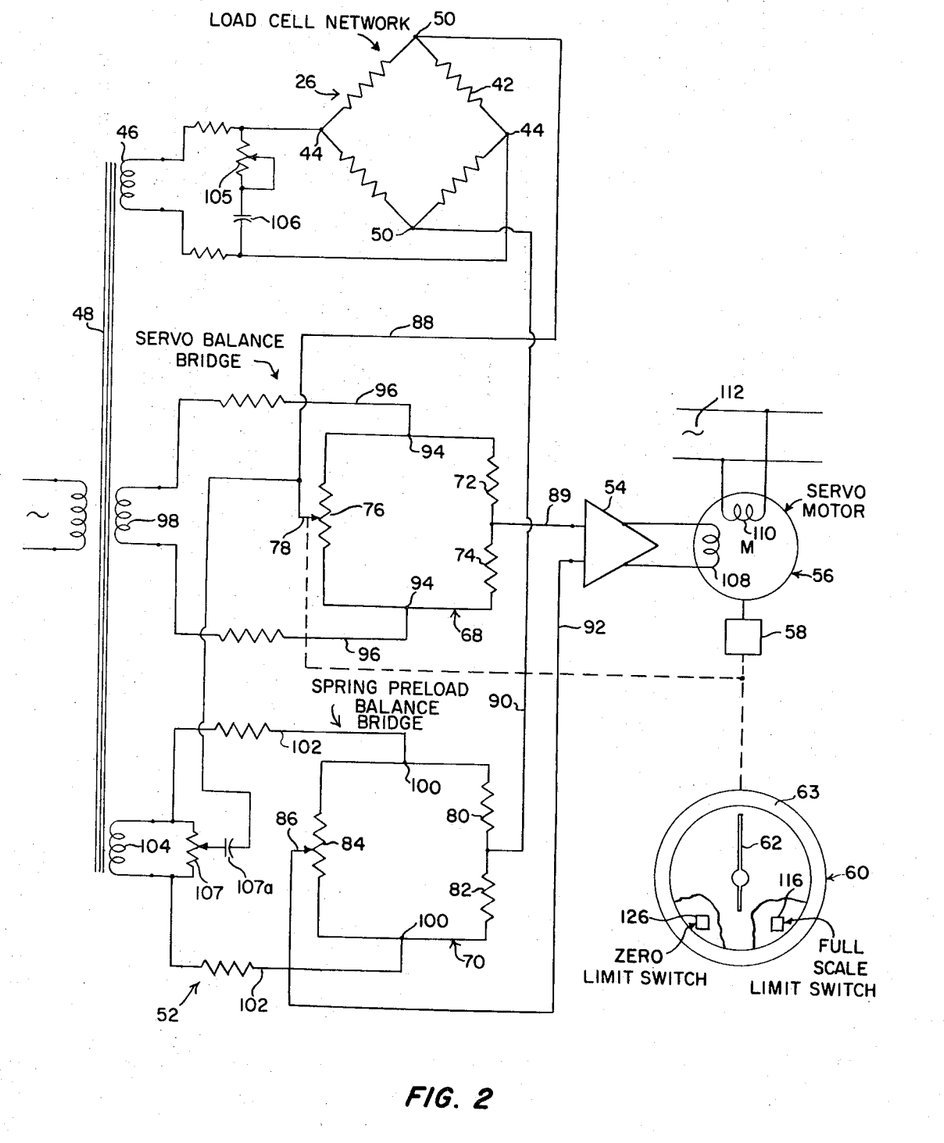
FIG. 2 is a circuit diagram of the servobalance and dead load bridge circuit shown in FIG. 1.

Conventionally, load cell 26 comprises a whetstone bridge 42 (see FIG. 2) having input terminals 44 connected across a constant voltage source such as the secondary winding 46 of a transformer 48. The output terminals of load cell 26, which are designated at 50, are connected to a servobalance and dead load bridge circuit 52 as shown in FIGS. 1 and 2. The load cell potential at output terminals 50 has a magnitude direction dependent upon the extent and direction of unbalance of the load cell bridge which is produced by the cell's response to the loading and unloading of the scale. In place of the alternating current source, which is applied to the input terminals of load cell 26 in this embodiment, a suitable source of direct current may be employed.

As shown in FIG. 1, the output of circuit 52 is connected to the input terminals of a conventional servoamplifier 54. The output terminals of amplifier 54 are connected to the control field portion of a reversible servomotor 56. Motor 56 is of suitable, conventional form and has an output shaft preferably connected through suitable reduction gearing 58 to the indicator shaft of a servodial mechanism 60. Dial mechanism 60 is of suitable conventional form and has a motor driven shaft-mounted weight indicator 62. Mechanism 60, as will be described in greater detail later on, is of the multirange type having an indexable multirange chart 63 on which visible indicia are changed to correspond to the weight range that is determined by drop weight mechanism 34.

Referring now to FIG. 2, circuit 52 comprises a servobalance bridge 68 and a spring preload tare bridge 70. Bridge 68 comprises a pair of fixed resistance elements 72 and 74 and a potentiometer 76 which has a movable wiper arm 78. Bridge 70 is likewise formed by a pair of fixed resistance elements 80 and 82 and a potentiometer 84 whose movable wiper arm is indicated at 86.

One of the load cell output terminals 50 is connected by an electrical conductor 88 to wiper arm 78. Potentiometer 76 provides two complimentary legs of bridge 68, and remaining complimentary legs of bridge 68 are respectively defined by resistance elements 72 and 74 in the well known manner. Bridge 68 has a fixed output terminal which is at the junction between resistance elements 72 and 74 and which is connected to one of the input terminals of amplifier 54 by an electrical conductor 89.

The other output terminal of the load cell bridge 42 is connected by an electrical conductor 90 to the fixed terminal junction between resistance elements 80 and 82 in bridge 70. Wiper arm 86 is connected to the other input terminal of amplifier 54 by an electrical conductor 92. Potentiometer 84 provides two complimentary legs of bridge 70, and the remaining complimentary legs of bridge 70 are respectively provided by resistance elements 80 and 82.

With continuing reference to FIG. 2, the fixed input terminals of bridge 68 are designated at 94, with one being at the junction between resistance element 72 and potentiometer 76, and the other being at the junction between resistance element 74 and potentiometer 76. Input terminals 94 are connected by electrical conductors 96 to the opposite terminals of a secondary winding 98 which may form a part of transformer 48. A predetermined constant voltage is therefore applied across input terminals 94.

Still referring to FIG. 2, the fixed input terminals of bridge 70 are designated at 100, with one being at the junction between resistance element 80 and potentiometer 84, and the other being at the junction between resistance element 82 and potentiometer 84. Input terminals 100 are connected by electrical conductors 102 to opposite terminals of a further secondary winding 104 which also may form a part of transformer 48. By this input circuitry, a constant, predetermined input voltage derived from winding 104 is applied across input terminals 100 of bridge 70.

The phases at secondary windings 46, 98, and 104 are required to be identical. To adjust the phasing, the resistance of a potentiometer 105 and a capacitor 106 are connected in series across the terminals of winding 46, and the resistance of a second potentiometer 107 is connected across the terminals of winding 104. The adjustable wiper of potentiometer 105 is connected to the junction between capacitor 106 and the resistance of potentiometer 105, and the adjustable wiper of potentiometer 107 is connected through a capacitor 107a to conductor 88. The phase conditions at windings 46, 98, and 104 may be adjusted by adjusting potentiometer 105 and 107.

When the dead load applied to lever 32 is tared by application of counterweight 37, spring 38 is adjusted or preloaded so that it will be in tension throughout the complete range of displacement of lever 32. The purpose of this preloading will be described later on. By preloading spring 38a force is applied to load cell 26 with the result that the load cell output voltage will not be zero when there is no load in the weigh hopper. By virtue of the previously described circuitry interconnecting bridges 42, 68 and 70 and amplifier 54, it is clear that the load cell output voltage, which is produced by preloading spring 38, is effectively electrically canceled or opposed by selectively adjusting wiper arm 86.

For the circuit shown in FIG. 2, wiper arm 86 is set so the voltage applied at that amplifier input terminal which is connected to conductor 92 will be at zero potential in absence of a load to be measured in the weigh hopper. This latter potential is the voltage across the output terminals of bridge 70 and represents the difference between the preset, spring preload balanced bridge potentiometer potential and the gross load cell voltage output which is the summation of the preload of spring 38 and the weight of the load delivered to support structure 20.

The net load cell output voltage is applied to the input circuit of amplifier 54 and is compared by amplifier 54 with the voltage across the output terminals of the servobalance bridge. The output signal voltage of amplifier 54 will therefore be proportional to the difference between the magnitudes of the voltages across the output terminals of bridge 70 and across the output terminals of bridge 68. The output shaft of motor 56 is mechanically connected through gearing 58 to wiper arm 78 in addition to being connected to drive dial indicator 62. Thus rotation of motor 56 in opposite directions inparts corresponding displacement to wiper arm 78 as well as dial indicator 62.

Motor 56 may be of any suitable form and is shown herein to be of the two phase type having a control field winding 108 and a main field winding 110. Winding 110 is energized from a suitable constant voltage source indicated at 112, and winding 108 is connected to the output terminals of amplifier 54.

Initially the voltage applied to the amplifier input terminals is balanced, but when wiper arm 86 is reset to adjust for the preloading of spring 38, a voltage difference will appear across the amplifier input terminals, and the resulting amplifier output voltage will energize winding 108 for driving motor 56 in one direction or the other depending upon the phase condition impressed upon the amplifier. Wiper arm 78 will therefore be shifted until the output voltage of bridge 70 again balances the output voltage of bridge 70.

When a load to be measured is applied to the scale mechanism, any increase in the net load cell voltage at the output of bridge 70 will be proportional to that portion of the weight of the load which is not counterbalanced by the range weights applied by drop weight mechanism 34. The phase of this net output load cell voltage will be in a predetermined direction to represent the increase. The amplifier signal input voltages, which were initially in balance, will now become electrically unbalanced. Amplifier 54, being phase sensitive, will therefore produce an output voltage (which is representative of the difference in magnitude of the amplifier input voltages) to energize control winding 108 in a predetermined direction such that when winding 110 is energized the motor output shaft will rotate in a direction to drive indicator 62 upscale and to advance wiper arm 78 in a direction to achieve electrical balance with the voltage across the output terminals of bridge 70. When an electrically balanced condition of amplifier input voltages is reestablished, control winding 108 will deenergize, and motor 56 will stop.

When the load in the weigh hopper is partially or completely discharged by opening door 22, the portion of the weight of the load which is not counterbalanced by the range weights in drop weight mechanism 34 will begin to decrease. As a result, the net load cell output voltage across the output terminals of bridge 70 will correspondingly decrease to unbalance the voltage condition impressed upon the input circuit of amplifier 54. Motor 56 in response to this change will therefore be energized for rotation in the opposite direction, and wiper arm 78 will be displaced in a corresponding direction to rebalance the amplifier input voltage conditions.

From the foregoing description it is clear that when a load of material is delivered in a stream to the weigh hopper, the resulting force is transmitted by the various levers in lever system 24 to load cell 26. As the load increases, the signal level of load cell 26 increases with the result that motor 56 is so energized as to advance indicator 62 upscale. If the increasing weight of material delivered to the weigh hopper exceeds the limit of the visible range on chart 63, indicator 62 will move to a limit position where it closes and is held against a full scale limit switch 116 (see FIG. 1).

By closing switch 116 a range change and chart indexing control circuit 120 is activated to accomplish two functions. First it actuates drop weight mechanism 34 to add one or more range weights 122 (see FIG. 4) to lever 32 so as to at least in part counterbalance the weight of the load delivered to the weigh hopper. Second, circuit 120, upon activation, indexes chart 63 in coordinated relation with each range weight added to lever 32. As a result, the visible weight range on chart 63 will change as each range weight is added so that it corresponds to the value of range weights applied to lever 32. The addition of range weights 122 will continue until there is sufficient balance in the scale mechanism to move indicator 62 downscale, thus bringing it within the limits of the indicator capacity of chart 63. When this condition occurs, indicator 62 moves off switch 116, allowing it to open.

When switch 116 is opened, circuit 120 is deactivated to deactuate drop weight mechanism 34, and to arrest the indexing of chart 63.

When the load in the weigh hopper is partially or completely discharged, motor 56 will be energized as previously explained to rotate its output shaft in such a direction that indicator 62 will move downscale. When indicator 62 passes just beyond the zero position on the dial, it closes and will be held against a zero limit switch 126 (see FIGS. 1 and 2). By closing limit switch 126, control circuit 120 is activated to cause drop weight mechanism 34 to remove one or more range weights from lever 32. Removal of range weights from lever 32 will continue until either all of the weights are removed or until the load applied to lever 32 is underbalanced by whatever range weights there are remaining on lever 32. The resulting output signal of load cell 26 will drive motor 56 in a direction to advance indicator 62 upscale as previously described. Switch 126 will therefore open to deactivate circuit 120, and drop weight mechanism 34 in consequently deactuated to stop the removal of range weights from lever 32. Simultaneously, the activation of control circuit 120 indexes range chart 63 so that the visual range will continue to be coordinated with the removal of range weights 122.

Thus, actuation of switch 116 to its closed position adds range weights to lever 32 while actuation of switch 126 removes range weights from lever 32. Switch 116 is located slightly beyond the full scale position so that indicator 62 may move to and indicate the weight at the upper limit of the range chart without causing the addition of a range weight to lever 32. Slight additional advancement of indicator 62 in an upscale direction, however, will actuate switch 116 for adding one or more range weights to lever 32. Similarly, switch 126 is located slightly beyond and on the downscale side of the zero position on the dial chart so that indicator 62 may advance downscale to its zero position without actuating switch 126 to cause a consequent removal of a range weight from lever 32. However, slight additional downscale movement of indicator 62 beyond its zero position will actuate switch 126 for removing range weights from lever 32.

By virtue of the foregoing relationship of load cell 26 to drop weight mechanism 34 and to lever system 24, it will be appreciated that when the force input to load cell 26 exceeds a magnitude as determined by the position of switch 116 on the dial, one or more range weights are added to lever 32 to reduce the force applied to the load cell. Thus, with the exception of the force exerted by spring 38, the force imposed upon load cell 26 will be proportional to the difference between the force exerted by the weight of the load being weighed and the counterbalancing range weight force. The weight indicating range of forces to which load cell 26 is subjected is therefore limited by the counterbalancing effect of range weights 122 such that it will be less than the total range or capacity of the load cell and of the scale itself. The effective weight-indicating range of load cell 26 is accordingly confined to a fractional proportion of the capacity of the scale.

With drop weight mechanism 34, the total scale capacity such as 80,000 pounds, for example, will be divided up into a preselected number of weight ranges. Eight ranges at 10,000 pounds per range may be selected as an illustration. Using an available precision lever system, the expected mechanical error will be 1 part in 10,000 or 8 pounds for full scale capacity as previously indicated. The weighing inaccuracy attributable to electrical system errors will be about 0.5 percent of 10,000 pounds or 5 pounds, and the total error will be slightly less than 9 pounds instead of the 80 pound error at full scale capacity in prior scales. Furthermore, the overall accuracy of the scale of this invention can be increased by increasing the number of ranges in mechanism 34.

Figure 3A:
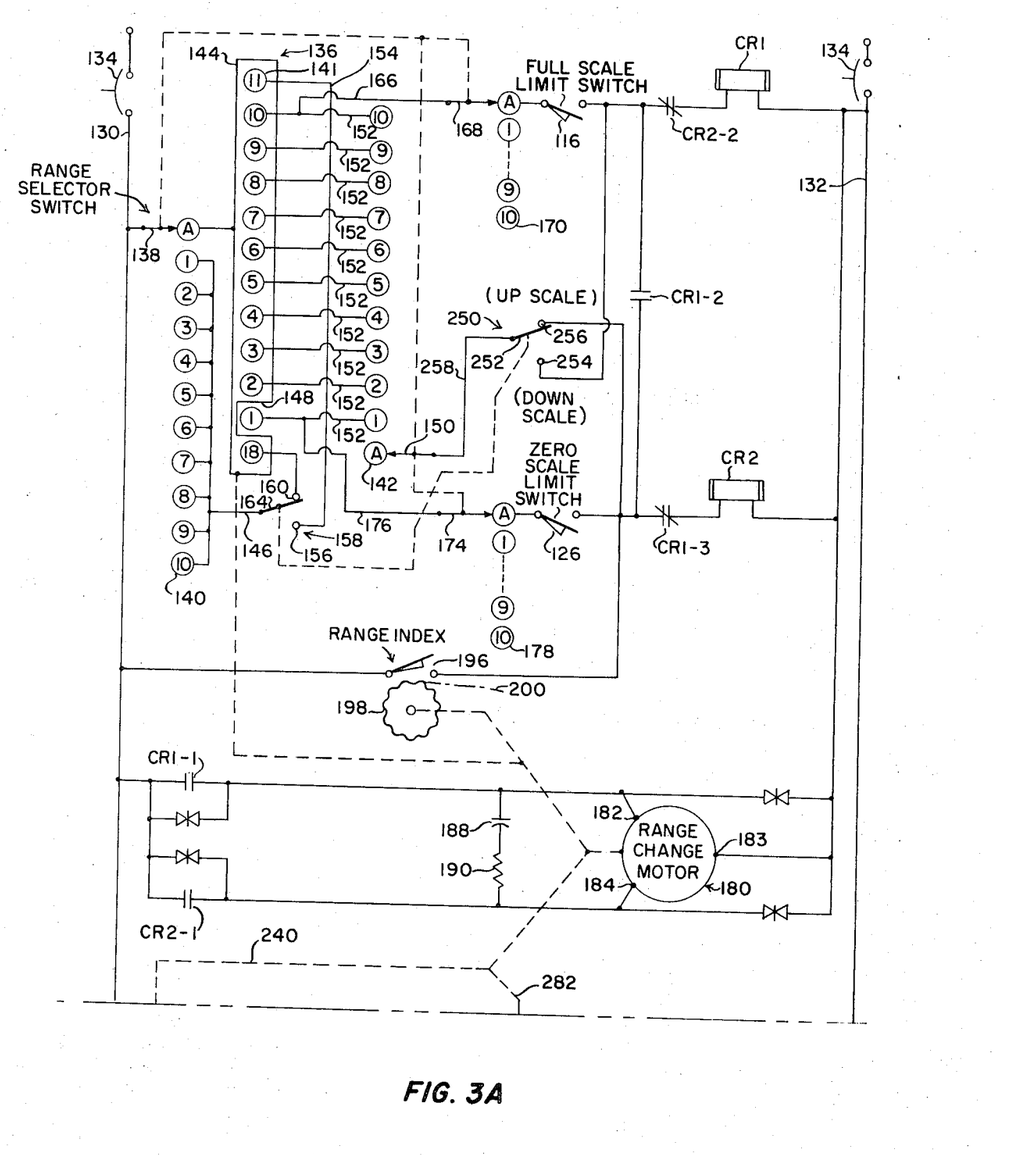
FIGS. 3A and 3B illustrate the control circuit shown in FIG. 1, with FIG. 3B being a continuation of the circuitry shown in FIG. 3A.
Figure 3B:
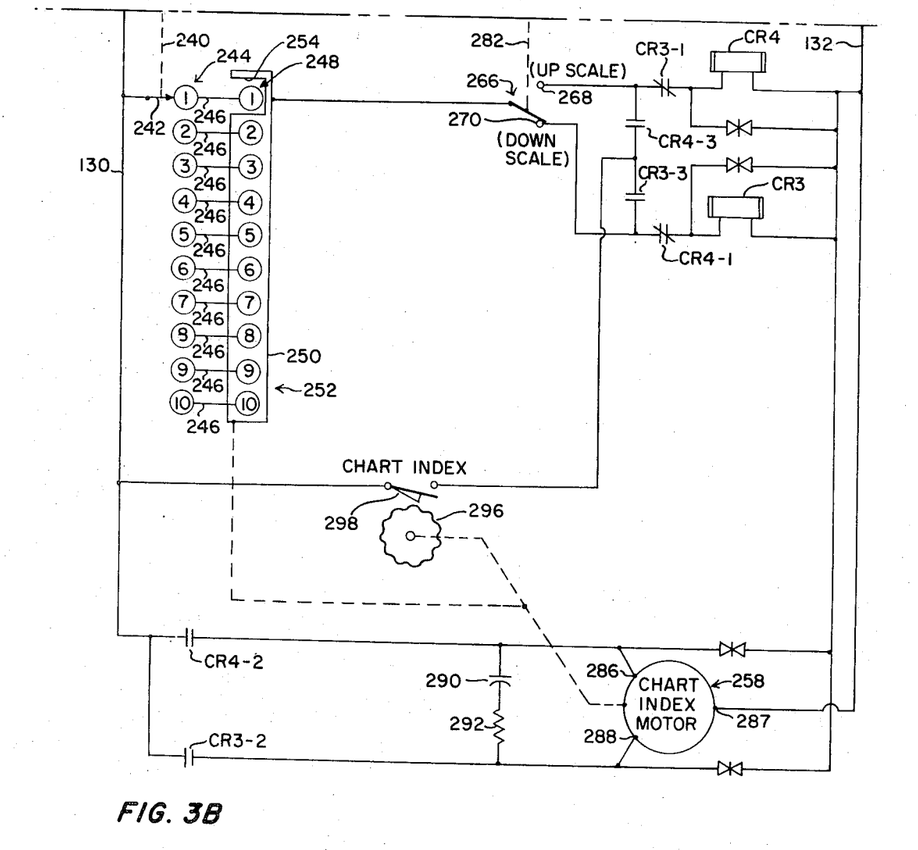

Referring now to FIGS. 3A and 3B and particularly to FIG. 3A, control circuit 120 is shown in a standby, deenergized condition and comprises a pair of electrical conductors 130 and 132 which are connected across a suitable source of operating power. Voltage from this source is made available across conductors 130 and 132 by closing a suitable disconnect switch indicated at 132.

With continued reference to FIG. 3A, a drop weight range selector switch 136 has a selectively displaceable wiper arm 138 which is connected to conductor 130. Switch 136 may be of any suitable construction and is shown to be of the progressive shorting type having three separate banks of fixed contacts or terminals 140, 141 and 142 and a displaceable shorting element 144. The first contact in bank 140 is indicated at A and is connected directly to shorting element 144. The remaining contacts in bank 140 preferably correspond in number to at least one minus the number of ranges provided in drop weight mechanism 34. In this example, 10 contacts are shown and are connected to a common conductor 146. As will become apparent shortly, arm 138 is selectively positioned to provide either automatic or selective operation of drop weight mechanism 134 and dial chart 63.

When arm 138 is positioned to contact terminal A in bank 140 the system is conditioned for automatic operation. Alternatively, a selected number of range weights may be applied to or removed from lever 32 by selectively shifting arm 138 to engage one of the numerically marked terminals in bank 140. Thus if it is desired to apply the first range weight to lever 32, wiper 138 is selectively shifted from the terminal marked 01 to the terminal marked 02. For applying the next range weight selectively, arm 138 is shifted down to the 03 position in bank 140, and so on.

Contact bank 141 has 11 contacts or terminals marked 1- —11 plus an additional contact or terminal marked 18. In any position of shorting element 144 all but one of the contacts in bank 141 will be in electrical contact with element 144. For the purpose of isolating one of the contacts in bank 141 from element 144, element 144 is notched, at 148. Thus in the position of element 144 shown in FIG. 3A all but the 01 contact in bank 141 electrically contacts element 144. Contact 01 of bank 141 is in notch 148 so that it is out of electrical engagement with element 144. When element 144 is shifted upwardly by one position, then the 02 contact in bank 141 will be positioned in notch 148 and consequently will be out of electrical contact with element 144. In the next position of element 144, the contact marked 03 will be out of contact with element 144, and so on.

With continuing reference to FIG. 3A, the contacts or terminals in bank 142 correspond in number and position to the contacts in bank 140. A wiper arm 150 is selectively engageable with the contacts in bank 142 and is mechanically ganged to arm 138. Thus by selectively displacing arm 138 to a selected contact in bank 140, arm 150 is also displaced to engage the corresponding contact in bank 142. For the position shown in FIG. 3A, arms 138 and 150 respectively engage the contacts marked A in banks 140 and 142 respectively. When arm 138 is displaced to engage the 01 contact in bank 140, arm 150 is correspondingly displaced to engage the 01 contact in bank 142 and so on.

The contacts in bank 142 are electrically isolated from each other. Likewise, the contacts in bank 141 are electrically isolated from each other except for the electrical connection provided by element 144. The numerically numbered contacts in bank 142 are separately connected by electrical conductors 152 to the correspondingly numbered contacts in bank 141. The contact marked 011 in bank 141 is connected by a conductor 154 to a fixed terminal 156 of a two-position switch 158. The other fixed terminal of switch 158 is indicated at 160 and is connected by an electrical conductor 162 to the contact marked 18 in bank 141. The movable element of switch 158 is indicated at 164 and is connected to conductor 146.

Still referring to FIG. 3A, the contact marked 010 in bank 141 is connected by a conductor 166 to a further selectively displaceable wiper arm 168 which is engageable with a series of fixed electrically isolated contacts or terminals in a bank 170. The number and position of contacts in bank 170 corresponds to that of bank 140. Arm 168 is ganged to arm 138 so that displacement of arm 138 causes corresponding displacement of arm 168. Thus arms 138, 150 and 168 will all engage corresponding contacts in their respective banks 140, 142 and 170. Accordingly, when arm 138 is positioned to engage the contact marked A in bank 140, arm 168 will contact the contact marked A in bank 170. When arm 138 is shifted to contact one of the numerically marked contacts in bank 140, arm 168 will also be shifted to contact the correspondingly numerically marked terminal in bank 170.

A further selectively displaceable wiper arm 174, which is connected by a conductor 176 to the terminals marked 01 in banks 141 and 142, is selectively engageable with a series of fixed electrically isolated terminals or contacts in a terminal bank 178. The terminals in bank 178 correspond in number and position to that of bank 140. Wiper arm 174 is also ganged to arm 138 so that selective displacement of arm 138 also displaces arm 174 to engage the contact in bank 178 which corresponds with the contact engaged by arm 138 in bank 140. Thus when arm 138 engages the terminal marked A in bank 140 arm 170 will engage the correspondingly marked terminal in bank 178. When arm 138 is selectively shifted to engage one of the numerically marked terminals in bank 140, arm 174 will be shifted to engage the correspondingly numerically marked terminal in bank 178.

The terminal marked A in bank 170 is connected to the full scale limit switch 116 which controls energization of a relay CR1. The terminal marked A in bank 178 is connected to the zero scale limit switch 126 which controls energization of another relay indicated at CR2 in FIG. 3A. Relays CR1 and CR2 control operation of a reversible motor 180 (FIG. 3A) which is connected to drive drop weight mechanism 134.

Motor 180 may be of any suitable form such as the type having field winding portions which are connected between a pair of motor terminals 182 and 183 and between terminal 183 and a further terminal 184. Terminal 183 is connected to conductor 132 as shown. Terminal 182 is connected through a set of normally open contacts CR1-1 of relay CR1 to conductor 130. Terminal 184 is connected through a set of normally open contacts CR2-1 to conductor 130. A branch circuit, comprising a capacitor 188 and a resistance element 190 in series relation, is connected between motor terminals 182 and 184 and constitutes a phase shifter to shift the phase between terminals 182 and 183 on the one hand and terminals 184 and 183 on the other hand so that the phase in one of the motor field winding portions lags behind the other to effect the motor rotation in opposite directions.

When contacts CR1-1 are closed by energizing relay CR1 the phase lag in the resulting motor field winding energizing circuit is such that motor 180 will be rotated in one predetermined direction corresponding to an upscale direction on the dial mechanism, on the other hand, closure of contacts CR2-1 by energizing relay CR2 results in a motor field winding phase lag that drives motor 180 in the opposite direction.

Preliminary to automatic operation of the system thus far described, arm 138 is selectively positioned so that it engages the contact marked A in bank 140. As a result, arms 150, 168, and 174 will also engage the contacts marked A in their respective contact banks 142, 170 and 178. Element 144 will be in the position shown in FIG. 3A.

At the beginning of the operation, there normally will be no material in the weigh hopper with the result that motor 56 has been operated to advance indicator 62 downscale to its zero position. At this stage, therefore, both switches 116 and 126 will be open. Relay CR1 and CR2 will therefore be deenergized. The energizing circuits for range motor 180 will consequently be interrupted. Switch 134 will be closed preparatory to operation. At this stage, none of the range weights 122 will be applied to lever 32.

When material is delivered to the weigh hopper, the output voltage of load cell 26 increases with the result that the unbalanced voltage signal condition is applied to amplifier 54 for energizing motor 56. Motor 56 as previously described will rotate in a direction to advance dial indicator 62 upscale. At this same time, motor 56 drives wiper 78 in a direction to achieve a balance of the signal voltages impressed upon the input circuit of amplifier 54. If the load applied to the weigh hopper exceeds the range on chart 63, dial indicator 62 will be moved beyond its full scale position and will engage and close limit switch 116. By closing switch 116, a circuit is completed for energizing relay CR1. This circuit may be traced from conductor 130 through arm 138, through the contact marked A in terminal bank 144, through the shorting element 144 of switch 136, through the contact marked 10 in bank 144, through arm 168, through the contact marked A in bank 170, through switch 116, through a set of normally closed contacts CR2-2 of relay CR2, and through the operating winding of relay CR1 to conductor 132. At this stage, switch 126 will be open with the result that relay CR2 will be deenergized. Contacts CR2-2 will consequently be closed.

By energizing relay CR1, contacts CR1-1 will close. In addition another set of normally open contacts CR1-2 will close, and a set of normally closed contacts CR1-3 will open. By opening contacts CR1-3, an energizing circuit for relay CR2 cannot be completed as long as relay CR1 is energized. By closing contacts CR1-2 a holding circuit for relay CR1 will be completed when a motor 180 operates to close a range index switch 196.

By energizing motor 180 in a range weight adding direction, a first of the range weights 122 is applied to lever 32 in a manner to be described in greater detail later on. Shorting element 144 which is displaced by operation of motor 180 will be shifted to its next position which corresponds to the applied range weight. In this position, the contact marked 02 in bank 141 will be positioned in notch 148. This, however, will have no effect upon the circuit connection made through the contact marked 010 in bank 141, for the contact marked 010 is still in electrical contact with element 144.

In addition to the foregoing function, range motor 180 also drives a cam 198 (see FIG. 3A) which is indexed by a chain 200 or the like with drop weight mechanism 34 so that advancement of cam 198 through a predetermined angle to its next position will be coordinated with the application of the first range weight 122 to lever 32.

When cam 198 reaches its next position, its camming surface will open switch 196 to interrupt the holding circuit for relay CR1. Thus, under conditions where the application of the range weight is enough to decrease the load cell output voltage for moving indicator 62 downscale and consequently off of switch 116 to allow switch 116 to open, an energizing circuit for relay CR1 will be maintained through switch 196 until switch 196 is opened by cam 198. Switch 196 will only be opened by cam 198 when the range weight is fully applied to lever 32. Thus, relay CR1 cannot be deenergized to in turn deenergize motor 180 until the range weight is displaced by operation of motor 180 to its properly seated position where it applies its full force to lever 32.

If the application of the first range weight to lever 32 does not provide sufficient counterbalancing force for moving dial indicator 62 downscale, indicator 62 will remain held against switch 116, thus keeping switch 116 closed. Thus, when switch 196 is opened by application of the first range weight to lever 32, relay CR1 will remain energized through switch 116. Range motor 180 will consequently remain energized to continue to drive drop weight mechanism 34 for applying the next range weight to lever 32.

When a sufficient portion of the load delivered to the weigh hopper is counterbalanced by one or more of the range weights applied to lever 32, indicator 62 is brought back within the limits of the dial chart 63, and as it moves downscale, it will allow switch 116 to open.

Assuming that the application of the second range weight to lever 32 decreases the load cell output voltage sufficiently to cause indicator 62 to move downscale, limit switch 116 may open before the range weight is fully in place. However, relay CR1 remains energized through switch 196 to maintain motor 180 energized until the range weight is fully in place. Switch 196 then opens, and relay CR1 will consequently be deenergized, for at this stage, switch 116 is open.

By deenergizing relay CR1, contacts CR1-1 open to deenergize motor 180. Actuation of drop weight mechanism 34 will therefore cease. Continued delivery of a load of material to the weigh hopper will again cause indicator 62 to move upscale and if it passes its full scale position again, it will close switch 116 to reenergize relay CR1. Motor 180 will again be energized through contact CR1-1 to add one or more range weights as previously described.

When door 22 is opened to discharge the load of material received in the weigh hopper, the load cell output voltage will immediately decrease and motor 56 will consequently be energized in the previously described manner to drive indicator 62 in a downscale direction. If the decreasing load passes beyond the lower limit on chart 63, indicator 62 will be driven beyond this limit to close and be held against limit switch 126. By closing limit switch 126, a circuit will be completed for energizing relay CR2. This energizing circuit may be traced from conductor 130, through arm 138, through shorting element 144, through the contact marked 01 in bank 141, through conductor 176, through arm 174, through the contact marked A in bank 178, through switch 126, through normally closed contacts CR1-3, and through the operating winding of relay CR2 to conductor 132. At this stage, the contact marked 01 in bank 141 will be in electrical contact with element 144 as a result of having previously stepped element 144 one position for each range weight that was applied to lever 32. Contacts CR1-3 will be closed, for at this stage, relay CR1 will be deenergized because switch 116 is open.

By energizing relay CR2, contacts CR2-1 will close and contacts CR2-2 will open. As a result of opening contacts CR2-2 relay CR1 cannot be energized as long as relay CR2 is energized.

By closing contacts CR2-1 an energizing circuit is completed for the motor field winding that drives motor 180 in a range weight removing direction. As a result, drop weight mechanism is operated in a manner to be described later on to remove one range weight from lever 32. If two range weights were previously added when the load was delivered to the weigh hopper, one range weight will remain applied to lever 32. If the reduction of the counterbalancing force provided by the drop weight mechanism 34 is sufficient, indicator 62 will move upscale and back within the upper and lower limits on the chart. As a result, switch 126 will open to deenergize relay CR2. By deenergizing relay CR2, contacts CR2-1 will open to deenergize motor 180 and thus deactuate drop weight mechanism 34.

Assuming that discharge door 22 remains open to continue the discharge of material from the weigh hopper, indicator 62 will again be driven by motor 56 in a downscale direction, and when it again passes the lower limit of chart 63 it will move against and close switch 126 to reenergize relay CR2. Reenergization of relay CR2 again energizes motor 180 for removing the first applied range weight from lever 32.

If, on the other hand, the removal of the first range weight does not bring indicator 62 back within the upper and lower limits of chart 63, indicator 62 will remain against switch 126 thus keeping switch 126 closed. Contacts CR2-1 will consequently remain closed to maintain the energizing circuit for driving motor 180 in its weight removing direction. When the first range weight is removed from lever 32, shorting element 144 will be shifted down by one position so that the contact marked 02 in bank 141 will be in notch 148. This will have no effect upon the energizing circuit for relay CR2 because the contact marked 01 in bank 141 will still be in electrical contact with shorting element 144.

When, however, the second range weight is removed from lever 32, shorting element 144 will be shifted by motor 180 back to its original position where the contact marked 01 in terminal bank 141 is now in notch 148. As a result, the electrical connection between the contact marked 01 in bank 141 and shorting element 144 is interrupted to thus interrupt the original energizing circuit for relay CR2.

As shown in FIG. 3A, switch 196, when closed, also provides a holding circuit for relay CR2. As a result, motor 180 upon being energized for rotation in a downscale direction cannot be deenergized until it reaches at least its next lower position. Even though switch 126 may open upon the initial movement of the range weight away from lever 32, energization of motor 180 will be maintained by virtue of the relay holding circuit through switch 196 to ensure that the removal of the range weight is completed before motor 180 is deenergized.

Figure 4:
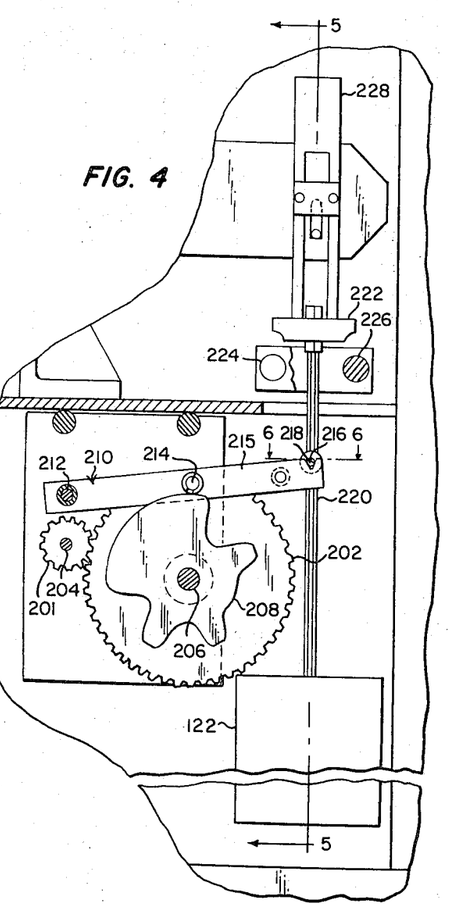
FIG. 4 is a partially sectioned front elevation of the drop weight mechanism schematically shown in FIG. 1.
Figure 5:
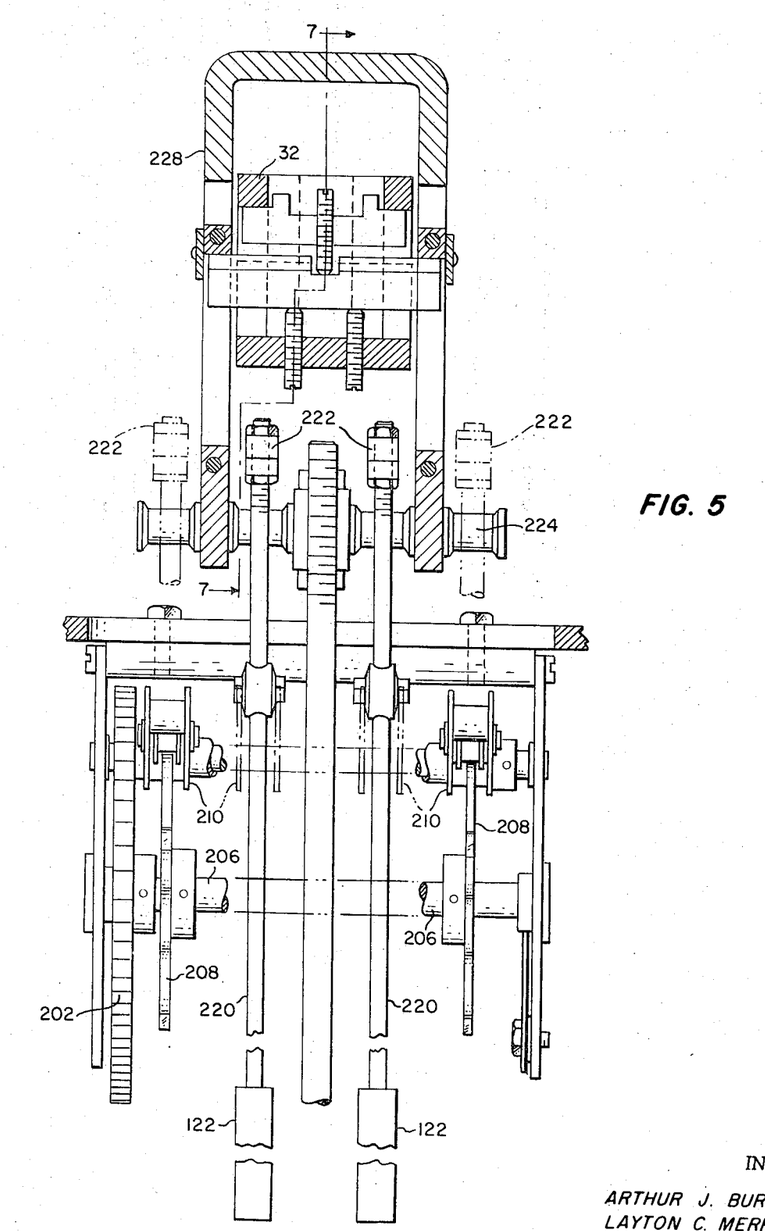
FIG. 5 is a section taken substantially along lines 5—5 of FIG. 4.

For the purposes of this invention, any suitable drop weight or multirange weight mechanism which is capable of being motor driven may be employed such as, for example, the one described in U.S. Letters Pat. 3,229,779 issued on Jan. 18, 1968 for Mechanical Apparatus. Such a drop weight mechanism as shown in FIGS. 4 and 5 herein comprises a drive gear 201 which constantly meshes with a larger gear 202. Gear 201 may be mounted on the output shaft of motor 180 which is indicated at 204 in FIG. 4. Gear 202 is mounted on a journaled cam shaft 206. Rotation of motor output shaft 204 in either direction will therefore rotate cam shaft 206 in a corresponding direction.

A plurality of cams 208 (one shown in FIG. 4), corresponding in number to the number of range weights 122 employed, are mounted on shaft 206. Associated with each cam 208 is a lever 210 which is pivotable about the axis of the fixed cylindrical pin 212. Each lever 210 carries a cam follower 214 which is engageable with the periphery of the associated cam 208.

Figure 6:
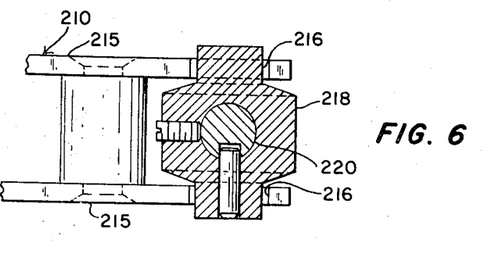
FIG. 6 is a section taken substantially along lines 6—6 of FIG. 4.

As shown in FIG. 6, each lever 210 is formed by a pair of parallel spaced apart arms 215 which are rigidly joined together. Adjacent to their corresponding ends remote from pin 212 arms 215 are notched at 216. Seated in notches 216 is a knife edge 218 which spans the space between arms 215. Each knife edge 218 is secured on a rod 220, and each rod 220 carries one of the range weights 122. The upper end of each rod is secured to a bridge member 222 as best shown in FIG. 7.

Figure 7:
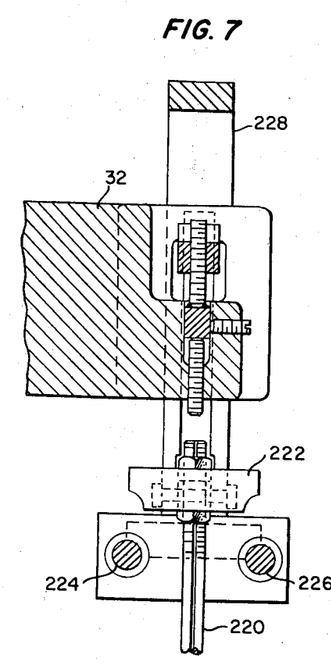
FIG. 7 is a section taken substantially along lines 7—7 of FIG. 5.

When each cam 208 is rotated through a predetermined angular distance the cam contour is such that the associated lever 210 will swing downwardly, and, as a result, the associated rod 220 together with its range weight 122 will be displaced downwardly to a position where bridge 222 seats on a pair of parallel, spaced apart spoollike members 224 and 226 (see FIG. 7). Members 224 and 226 are supported at opposite ends on a yoke 228 which straddles and is fixed to lever 32.

From the foregoing construction it is clear that as each cam 208 is rotated through a predetermined angle the associated lever 210 will swing downwardly to follow the cam contour under the influence of the force exerted by the associated range weight 122. When the associated bridge 222 seats on members 224 and 226 the associated range weight 122 will no longer be supported by lever 210, but instead will now be suspended and thus supported from beam 32 through the connections provided by members 224 and 226 and yoke 228.

By reversing rotation of each cam 208, the associated lever 210 is swung upwardly to engage its associated knife edge 218 and to thus vertically lift the associated rod 220 and range weight 122. As a result, bridge 222 is raised from its seated position on members 224 and 226, thereby removing the associated range weight 122 from lever 32. In practice, cams 208 are so contoured and positioned on cam shaft 206 that range weights 122 will successively be dropped so as to be supported on yoke 228 at different rotational positions of shaft 204.

To index range chart 63 in coordinated relation with the range weights applied to or removed from lever 32, range motor 180 is mechanically coupled by suitable means indicated at 240 in FIGS. 3A and 3B to a wiper arm 242 (see FIG. 3B) which is connected to conductor 130 and which is displaceable by operation of range motor 180 to successively engage a series of fixed, electrically isolated contacts or terminals in a contact bank 244. The number of terminals in bank 244 correspond to the number of numerically marked contacts in bank 140.

With continued reference to FIG. 3B, the contacts in bank 244 are individually connected by conductors 246 to a series of correspondingly marked, electrically isolated, fixed terminals or contacts in a further contact bank 248. Wiper arm 242 and contact banks 244 and 248 together with a progressive shorting element 250 form a multiposition switch 252 of the progressive shorting type. Element 250 is electrically associated with bank 248 and is notched at 254 so that it will be in electrical contact with all but one of the contacts in bank 248. In the position shown in FIG. 3B, element 250 is in electrical contact with all of the contacts in bank 248 except the contact marked 01 which is disposed in notch 254.

Shorting element 250 is displaced by a reversible, chart index motor 256 such that the contacts in bank 248 will successively be positioned in notch 254. By energizing motor 258 to advance in an upscale direction by one position, element 250 will be displaced such that the contact marked 02 in bank 248 will be positioned in notch 254. Upscale advancement of motor 258 to its next position shifts element 250 to its next position where the contact marked 03 in bank 248 will be positioned in notch 254 and so on.

Figure 8:
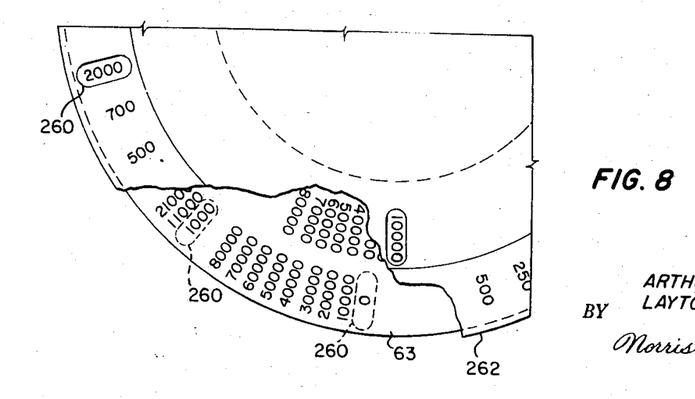
FIG. 8 is an enlarged, fragmentary view of the multirange dial chart shown in FIG. 1.

As will be described in greater detail later on, rotation of motor 258 in one direction or the other drive chart 63 in a corresponding direction such that the indicia on chart 63 which are visible through windows 260 (see FIG. 8) in the dial face 262 will change in accordance with the range weights 122 applied to or removed from lever 32.

Referring back to FIG. 3B, shorting element 250 is connected to the movable element of a two position switch 266 which has a pair of fixed contacts 268 and 270. The movable element of switch 266 is mechanically connected to range motor 180 by means schematically indicated at 272 such that the movable element of switch 266 will engage contact 268 when range motor 180 is advanced in an upscale direction and that the movable element of switch 266 will engage contact 270 when range motor 180 advance in a downscale direction.

Contact 268 is serially connected through a set of normally closed contacts CR3-1 of a relay CR3 and the operating winding of a relay CR4 to conductor 132. Contact 270 is serially connected through a set of normally closed contacts CR4-1 of relay CR4 and the operating winding of relay CR3 to conductor 132.

Chart motor 258, which may be of the same conventional form as range motor 180 has unshown field winding portions connected between motor terminals 286 and 287 and between terminal 287 and a further motor terminal 288. A branch circuit connected between terminals 286 and 288 and containing a capacitor 290 and a resistance element 292 in series defines a phase shifting network such that one field winding portion in motor 258 will lag behind the other to thus facilitate rotation of motor 258 in opposite directions in the same manner described in connection with motor 180.

Energization of relay CR4 will result in energization of that chart motor field winding with a phase condition that drives chart motor 258 in a upscale direction, and energization of relay CR3 will result in the energization of that chart motor field winding with a phase direction that drives motor 258 in a downscale direction.

When there are no range weights applied to lever 32, range motor 180 will position wiper 242 to engage the contact marked 01 in bank 244 and chart motor 258 will position element 250 such that the contact marked 01 of bank 248 will be located in notch 254. As a result, neither relay CR4 nor relay CR3 can be energized. When range motor 180 is advanced from this home position to its first position, for applying one of the range weights 122 to lever 32, arm 242 will be advanced from its position on the contact marked 01 in bank 244 to its next position where it engages the contact marked 02 in bank 244. In addition, the movable element of switch 266 will be shifted into engagement with contact 268. As a result, a circuit will be completed for energizing relay CR4. This circuit may be traced from conductor 130, through arm 242, through the contact marked 02 in bank 244, through the contact marked 02 in bank 248, through shorting element 250, through switch 266, through contacts CR3-1, and through the operating winding of relay CR4 to conductor 132. At this stage, relay CR3 will be deenergized with the result that contacts CR3-1 will be closed.

By energizing relay CR4, contacts CR4-1 open, and normally open contacts CR4-2 close. By opening contacts CR4-1 relay CR3 cannot be energized as long as relay CR4 is energized. By closing contacts CR4-2, motor 258 is energized in an upscale direction. Chart 63, which comprises a plate, is mounted by any suitable means for rotation about an axis preferably aligning with axis about which pointer 62 is swingable. Suitable means schematically indicated at 293 in FIG. 1 drive connects motor 258 to chart 63. Upon upscale energization of motor 258, therefore, chart 63 will correspondingly be advanced upscale to its next position corresponding to the range weight which was added to lever 32 by operation of motor 180. The indicia visible through windows 260 (see FIG. 8) will now change to conform to the value of the range weight applied to lever 32. If each range weight is 10,000 pounds then the initial advancement of the chart shifts the number 10,000 into registry with the first or zero position window in place of the zero that was originally there.

As motor 258 is rotated from its home position to its next position, it also drives a chart indexing cam 296. Cam 296 actuates a detent switch 298 which is in the common portion of two holding circuits for relays CR4 and CR3 respectively. When switch 298 is closed, the holding circuit for relay CR4 is completed if relay CR4 has been energized to close a set of normally open contacts CR4-3. This holding circuit may be traced from conductor, through switch 298, through contacts CR4-3, through contacts CR3-1, and through the operating winding of relay CR4 to conductor 132.

As motor 258 advances from one position to the next, switch 298 will be held closed by cam 296 and will remain closed until advancement of motor 258 to the next position has been completed. At this point, switch 298 will be opened by cam 296 to interrupt the holding circuit for relay CR4. Once motor 258 is energized, therefore, it cannot be deenergized until it reaches at least its next position.

If operation of motor 180 effects the application of two range weights to lever 32, arm 242 will be advanced successively from its position on the contact marked 01 in bank 244, to its position on the contact marked 02 in bank 244, and then to its position on the contact marked 03 in bank 244. As previously described, engagement of arm 242 with the contact marked 02 in bank 244 will result in the energization of motor 258, and chart 63 will consequently be driven in an upscale direction to bring the number 10,000 into registry with the zero position window in the dial face.

Energization of motor 258 in an upscale direction also shifts shorting element 250 downwardly, and when the contact marked 02 of bank 244 becomes positioned in notch 254, the original energizing circuit for relay CR4 will be interrupted. If at this stage arm 242 is still on the contact marked 02 in bank 244 and if switch 298 has opened, relay CR4 deenergizes to deenergize motor 258.

Continued operation of motor 180, however, shifts arm 242 to its position on the contact marked 03 in bank 244, to thus remake the energizing circuit for relay CR4 if the relay energizing circuit was previously interrupted. Motor 258 will therefore be energized to advance chart 63 upscale to its next position where the number 20,000 is moved into registry with the zero position window in the dial face. Shorting element 250 will also be shifted downwardly, and when the contact marked 03 in bank 248 is positioned in notch 254, the original energizing circuit for relay CR4 will be interrupted. If this condition occurs before chart 63 reaches its position corresponding to the addition of the two range weights to lever 32, relay CR4 will remain energized through switch 298, and when displacement of chart 63 is completed such that the number 20,000 is fully in registry with the first or zero position window in the dial face switch 298 opens to deenergize relay CR4. As a result, contact CR4-2 opens to deenergize motor 258.

If motor 180 is subsequently energized in a down scale direction, it shifts the movable element of switch 266 into engagement with contact 270. In addition, energization of motor 180 will shift wiper arm 242 back towards its home position at the contact marked 01 in bank 244. When arm 242 reaches the contact marked 02 in bank 244, a circuit will be completed for energizing relay CR3. This circuit may be traced from conductor 130, through arm 242, through the contact marked 02 in bank 244, through the contact marked 02 in bank 248, through switch 266, through normally closed contacts CR4-1 and through the operating winding of relay CR3 to conductor 132. By energizing relay CR3, contacts CR3-1 will open, and normally open contacts CR3-2 and CR3-3 will close. By opening contacts CR3-1, relay CR4 cannot be energized as long as relay CR3 is energized. By closing contacts CR3-2, a circuit is completed for energizing motor 258 such that chart 63 will be driven in a downscale direction. In addition motor 258 will rotate cam 296 as previously described, and it furthermore will displace shorting element 250 back towards its illustrated home position. As cam 296 begins to rotate, switch 298 will be closed to complete a holding circuit for relay CR3 through contacts CR3-3.

If motor 180 is operated to remove all of the range weights from lever 32, arm 242 will be advanced to its position where it engages the contact marked 01 in bank 244, and motor 258 will be operated to return chart 63 to its home position where the zero is in registry with the zero position window. Also element 250 will be stepped back to its illustrated home position, and when this occurs, the original energizing circuit for relay CR3 will be interrupted. If at this time, motor 258 has not fully returned to its corresponding home position, switch 298 will still be closed with the result that relay CR3 will remain energized to keep motor 258 energized. When motor 258 returns completely to its home position where the zero on chart 63 appears in the first or zero position window on the dial face, then switch 298 will open to interrupt the holding circuit for relay CR3. Relay CR3 will now be deenergized to open contacts CR3-2 and to thus deenergize motor 258.

Instead of automatically operating drop weight mechanism 34, range weights in mechanism 34 may selectively be added or removed by shifting wiper arm 138 to the appropriate numerically marked contact in bank 140. If, for example, there are no range weights on lever 32 and it is desired to selectively apply two range weights to the lever, then arm 138 is shifted to a position where it engages the contact marked 03 in bank 140. Arms 168 and 174 will also be shifted to engage correspondingly marked contacts in bank 170 and 178.

By shifting arm 168 out of engagement with contact marked A in bank 170, a circuit for energizing relay CR1 through switch 116 cannot now be completed. Similarly, by shifting arm 174 out of engagement with the contact marked A in bank 178, a circuit for energizing relay CR2 cannot now be completed through switch 126. Switches 116 and 126 are thus removed from the active circuit and if actuated no longer control operation of motor 180.

In order to selectively add range weights to lever 32, switch 158 is selectively actuated to engage the movable element 164 with contact 156. Switch 158, as shown in FIG. 3A, is ganged to a second two position switch 250 having a movable element 252 which is alternately engageable with contacts 254 and 256. Element 252 is connected by an electrical conductor 258 to wiper arm 150.

When element 164 is moved into engagement with contact 156, element 252 will be moved into engagement with contact 256, and when arm 138 is shifted into engagement with the contact marked 03 in bank 140, arm 150 will be shifted into engagement with the correspondingly marked contact in bank 142. As a result, a circuit will be completed for energizing relay CR1. This circuit may be traced from conductor 130, through arm 138, through the contact marked 03 in bank 140, through switch 158, through conductor 154, through the contact marked 011 in bank 141, through shorting element 144, through the contact marked 03 in bank 141, through conductor 152, through the contact marked 03 in bank 142, through arm 150, through conductor 258, through switch element 252, through contact 256, through normally closed contacts CR2-2 and through the operating winding of relay CR1 to conductor 132.

Thus, motor 180 will be energized in the manner previously described to apply range weights to lever 32. Energization of motor 180 also steps shorting element 144, as previously explained, and when the contact marked 03 in bank 141 becomes positioned in notch 148, the energizing circuit for relay CR1 will be interrupted. Motor 180 will thereby be deenergized upon applying the second range weight to lever 32.

If it is now desired to remove one or both of the applied range weights from lever 32, arm 138 is selectively positioned on the contact marked 02 in bank 140 for removing one range weight or the contact marked 01 in bank 140 for removing both range weights. As long as arm 138 remains in engagement with one of the numerically marked contacts in bank 140, automatic operation will not be resumed.

In addition to selectively positioning arm 138, switches 158 and 250 also must be selectively actuated such that their movable elements will respectively engage contacts 160 and 254.

If arm 138 is shifted to the contact marked 01 in bank 140 for removing both of the applied range weights, a circuit will be completed for energizing relay CR2. This circuit may be traced from conductor 130, through arm 138, through the contact marked 01 in bank 140, through switch 158, through the contact marked 018 in bank 141, through shorting element 144, through the contact marked 01 in bank 141, through the connected conductor 152, through the contact marked 01 in bank 142, through arm 150, through conductor 258, through the movable switch element 252, through contact 254, through normally closed contacts CR1-3, and through the operating winding of relay CR2 to conductor 132. As a result, motor 180 will be energized in a downscale direction. It will be appreciated that when the two range weights are applied to lever 32 by upscale operation of motor 180, shorting element 144 was shifted to a position where electrical contact was made with the contact marked 01 in bank 141. Also when arm 138 was shifted to engage the contact 01 in bank 140, arm 150 was also shifted to engage the correspondingly marked contact in bank 142.

By energizing motor 180 in a downscale direction, shorting element 144 will be stepped back toward its illustrated home position. When shorting element 144 reached this position, the contact marked 01 in bank 141 will again be positioned in notch 148 to thus interrupt the energizing circuit for relay CR2. Motor 180 will therefore be deenergized to cease actuation of mechanism 34.

It will be appreciated that in this embodiment, range weights 122 are sized to equal the scale range on dial face 262. Chain 200 may be engaged with suitable unshown sprocket wheels connected to shaft 206 and to cam 198 to ensure that the position of cam 198 is correlated with the position to which shaft 206 is driven by motor 180.

In the foregoing embodiment, range weights are applied to lever 32 to increase the load-counterbalancing force. Alternatively, there are drop weight mechanism such as that described in U.S. Letters Pat. No. 3,232,365 wherein the removal of the range weights results in an increase of the counterbalancing force. It is clear that this latter type of drop weight mechanism or any other suitable, conventional mechanism such as a binary mechanism may be utilized without departing from the spirit of this invention.

As previously described, spring 38 is initially adjusted so that it is preloaded in tension. Stops 39a and 39b are adjustably set close enough to each other to prevent that much travel that would remove the tension from spring 38. As a result, spring 38 will always be tensioned under normal conditions to continuously bias yoke piece 41 into seating engagement with knife edge 41a, thereby ensuring that there will always be a sufficient loading force to keep the knife edge seated on its bearing pivot. Spring 38 therefore prevents the knife edges in the system from effectively floating as the forces applied by the load being weighed and drop weight mechanism 34 are varied.

In absence of spring 38 and its relationship with stops 39a and 39b, the knife edges in the lever system may unseat from their bearing pivots and thus begin to float when there is a sudden change in the weight of the load applied to lever 32. For example, if the counterbalancing force exerted by the range weights is high and the weight of the load in the weigh hopper is suddenly reduced, lever 32 will rapidly swing in a clockwise direction as viewed from FIG. 1, tending to pull knife edge 41a away from yoke piece 41, and thus causing a loss of tension in the lever system. This objectionable condition is avoided by preloading spring 38 in tension and by positioning stops 39a and 39b sufficiently close that throughout the maximum angular displacement of lever 32 that is permitted by stops 39a and 39b, spring 38 is maintained in tension.

Spring 38 is furthermore constructed so that it will fail before the force applied to load cell 26 becomes so great as to cause damage to the load cell. Such a condition could occur if lever 32 misses the lower stop or if the lower stop fails, allowing excessive pivotal motion of lever 32 in a counterclockwise direction under the influence of a load that exceeds the capacity of load cell 26. With this feature of the invention, the capacity of load cell 26 may be selected to safely handle only the maximum incremental range of the multirange or drop mechanism which in the previous example was 10,000 pounds. The load cell capacity will thus be considerably smaller than the total capacity of the scale. It will be appreciated that significant savings are realized by reducing that capacity needed for the load cell.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A weighing apparatus comprising a force-transmitting lever structure pivoted about a fulcrum, means for applying the force exerted by a load to be measured to said lever structure, load cell means operatively connected to said lever structure for producing a signal voltage that is representative of the load exerted force transmitted thereto by said lever structure, means for counterbalancing at least a part of the load-exerted force by applying a further force of predetermined magnitude to said lever structure in counterbalancing relation to said load-exerted force to reduce the force transmitted to said load cell means by a predetermined magnitude when the force transmitted to said load cell means exceeds a predetermined value such that the signal voltage represents the total weight of said load minus the amount that is counterbalanced upon application of said further force, and signal utilization means operatively connected to said load cell means to provide a readout of said signal voltage in terms of weight whereby the total weight of the load is effectively determined by the sum of the signal voltage readout and the amount counterbalanced by said further force.

2. The weighing apparatus defined in claim 1 comprising means under the control of said signal voltage for increasing said further force by a predetermined magnitude in response to a predetermined increase in said signal voltage.

3. The weighing apparatus defined in claim 1 comprising means under the control of said signal voltage for increasing said further force by a predetermined magnitude in response to a predetermined increase in said signal voltage and for decreasing said further force by a predetermined magnitude in response to a predetermined decrease in said signal voltage.

4. The weighing apparatus defined in claim 1 wherein said counterbalancing means comprises a multirange weight mechanism having a predetermined number of weights of predetermined size and means for shifting said weights between positions where they are respectively applied to and removed from said lever structure such that the magnitude of said further force is determined by the number and size of the weights applied to said lever structure.

5. The weighing apparatus defined in claim 4 comprising means under the control of said signal voltage and being operatively connected to said mechanism to control the application and removal of said predetermined number of weights for effecting an increase in said further force when said signal voltage exceeds a predetermined value and for effecting a decrease in said further force when said voltage decreases below a predetermined value.

6. A weighing system comprising load cell means for producing a signal voltage that is representative of a force mechanically applied thereto, means for applying the force exerted by a load to be measured to said load cell means, signal utilization means operatively connected to said load cell means and being controlled by said signal voltage, and means responsive to the application to said load cell means of a load exerted force exceeding a predetermined magnitude for reducing the magnitude thereof by a predetermined amount.

7. The weighing system defined in claim 6 wherein said signal utilization means is operative to provide an indication of the weight represented by the magnitude of said signal voltage, and wherein means are provided for indicating the amount by which said force is reduced which when effectively added to the amount indicated by said signal utilization means provides an indication of the total weight of said load.

8. A weighing apparatus comprising a force-transmitting lever structure pivoted on a fulcrum, means for applying the force exerted by a load to be measured to said lever structure, a load cell operatively connected to said lever structure for producing a weight-indicating signal voltage that is representative of the load-exerted force transmitted thereto by said lever structure, a mechanism actuatable to apply a further force of predetermined magnitude to said lever structure in counterbalancing relation to the applied load-exerted force for reducing the load-exerted force transmitted by said structure to said load cell by a predetermined increment whereby upon application of said further force, the total weight of said load is effectively equal to the sum of said increment and the amount represented by said signal voltage, and means responsive to a predetermined increase in said signal voltage for actuating said mechanism to effect the application of said further force to said lever structure.

9. The weighing apparatus defined in claim 8 wherein said means for actuating said force-applying mechanism comprises an indicating mechanism operatively connected to said load cell to provide a readout of said signal voltage in terms of weight, and electrical control circuit means operatively connected to said indicating mechanism and said force-applying mechanism and being activated by the former to actuate the latter when the former reads out a predetermined weight.

10. The weighing apparatus defined in claim 9 wherein said indicator mechanism comprises relatively movable scale and indicator members, wherein means operated by said signal voltage are provided for effecting relative movement between said members to indicate the weight represented by said signal voltage, wherein said control circuit comprises switching means actuated by predetermined relative movement of said members and motor means energized by actuation of said switching means, and wherein said mechanism comprises a predetermined number of weights of predetermined size mounted for displacement between positions where they are respectively applied to and removed from said lever structure such that the magnitude of said further force is determined by the number and size of the weights applied to said lever structure, and means driven by said motor means upon energization thereof for shifting a predetermined number of said weights between said positions.

11. A weighing apparatus comprising load cell means for producing an electrical signal that is representative of a force applied thereto, a lever system for applying to said load cell means a load to be weighed, means responsive to said signal for applying to said lever system a force of predetermined magnitude in counterbalancing relation to the applied weight of said load when said signal exceeds a predetermined magnitude to reduce said electrical signal by a predetermined magnitude, and means providing a readout that is a weight representing function of the sum of the electrical signal and the magnitude by which it is reduced by said counterbalancing force less any preloading force applied to said load cell means in addition to the applied weight of said load.

12. A weighing apparatus comprising a force-transmitting lever structure pivoted about a fulcrum, means for applying the force exerted by a load to be measured to said lever structure, means applying a further force to said lever structure to counterbalance a predetermined proportion of the load-exerted force, load cell means operatively connected to said lever structure for producing an electrical signal that is representative of that portion of said load-exerted force which is not counterbalanced by said further force, and means operatively connected to said load cell means and to said further force applying means to provide a readout that is a weight-representing function of the sum of the weights respectively represented by said electrical signal and the amount by which the load-exerted force is counterbalanced by said further force applying means.

13. The weighing apparatus defined in claim 12 comprising bearing means connected to said load cell means, knife edge means mounted on said lever structure and being seated on said bearing means for transmitting to said load cell the unbalanced portion of the load-exerted force, the unbalanced portion of the load-exerted force being effective to pivot said lever structure in a predetermined direction, stop means for limiting pivotal motion of said lever structure to a predetermined angle in opposite directions, and resilient means suspending said load cell means from a support surface and being in tension throughout the entire angle through which said lever structure is permitted to pivot to apply a yieldable force for maintaining said bearing means in seating engagement with said knife edge means.

14. The weighing apparatus defined in claim 13 wherein said resilient means comprises spring means constructed to structurally fail when the unbalanced portion of the load exerted force exceeds a predetermined value which is less than the capacity of said load cell means.

UNITED STATES PATENT OFFICE
CERTIFICATE OF CORRECTION

Patent No. 3,561,554      Dated February 9, 1971

Inventor(s) Layton C. Merriam & Arthur J. Burke

It is certified that error appears in the above-identified patent and that said Letters Patent are hereby corrected as shown below:

```
Column 7, line 24, change "01" to --#1--.
Column 7, line 25, change "02" to --#2--.
Column 7, line 26, change "03" to --#3--.
  "       ", line 34, change "01" to --#1--.
  "       ", line 35, change "01" to --#1--.
  "       ", line 38, change "02" to --#2--.
  "       ", line 47, change "03" to --#3--.
  "       ", line 52, change "01" to --#1--.
  "       ", line 53, change "01" to --#1--.
  "       ", line 61, change "011" to --#11--.
  "       ", line 67, change "010" to --#10--.
Column 8, line 10, change "01" to --#1--.
Column 9, line 29, change "02" to --#2--.
  "       ", line 32, change "010" to --#10-- (both occurrences)
Column 10, line 19, change "01" to --#1--.
  "       ", line 24, change "01" to --#1--.
  "       ", line 63, change "01" to --#1--.
  "       ", line 64, change "01" to --#1--.
  "       ", line 67, change "01" to --#1--.
  "       ", line 69, change "01" to --#1--.
Column 12, line 12, change "01" to --#1--.
  "       ", line 17, change "02" to --#2--.
  "       ", line 20, change "03" to --#3--.
  "       ", line 36, "advance" should be --advances--.
  "       ", line 61, change "01" to --#1--.
  "       ", line 62, change "01" to --#1--.
  "       ", line 67, change "01" to --#1--.
  "       ", lines 68 & 73, change "02" to --#2--.
Column 13, line 1, change "02" to --#2--.
  "       ", line 43, change "01" to --#1--.
  "       ", line 44, change "02" to --#2--.
  "       ", line 45, change "03" to --#3--.
  "       ", line 47, change "02" to --#2--.
```

Page #2

UNITED STATES PATENT OFFICE
CERTIFICATE OF CORRECTION

Patent No. 3,561,554      Dated February 9, 1971

Inventor(s) Layton C. Merriam & Arthur J. Burke

It is certified that error appears in the above-identified patent and that said Letters Patent are hereby corrected as shown below:

```
Column 13, lines 53 & 55, change "02" to --#2--.
   "       "  , lines 59 & 66, change "03" to --#3--.
Column 14, line 5, change "01" to --#1--.
   "       "  , lines 6, 9 & 10, change "02" to --#2--.
   "       "  , line 25, change "01" to --#1--.
   "       "  , line 45, change "03" to --#3--.
   "       "  , lines 66, 70, 73 & 74, change "03" to --#3--.
   "       "  , line 72, change "011" to --#11--.
Column 15, line 8, change "03" to --#3--.
   "       "  , line 15, change "02" to --#2--.
   "       "  , line 16, change "01" to --#1--.
   "       "  , line 24, change "01" to --#1--.
   "       "  , line 28, change "01" to --#1--.
   "       "  , line 29, change "018" to --#18--.
   "       "  , line 30, change "01" to --#1--.
   "       "  , line 32, change "01" to --#1--.
   "       "  , line 40, change "01" to --#1--.
   "       "  , line 42, change "01" to --#1--.
   "       "  , line 47, change "01" to --#1--.
```

Signed and sealed this 5th day of October 1971.

(SEAL)
Attest:

EDWARD M. FLETCHER, JR.
Attesting Officer

ROBERT GOTTSCHALK
Acting Commissioner of Paten